Patented Sept. 3, 1935

2,012,948

UNITED STATES PATENT OFFICE 2,012,948

FLEXIBLE MICA PRODUCT AND METHOD OF MAKING SAME

Willis A. Boughton, Cambridge, Mass., assignor to New England Mica Co., Waltham, Mass., a corporation of Massachusetts No Drawing. Application January 16, 1931, Serial No. 509,285

5 Claims. (Cl. 154—2.6)

My invention relates to laminated flexible mica products, for example, plates, sheets, tapes, tubes and other special forms, which may be deformed without destruction, and which are made by cementing mica flakes of the desired size by means of an essentially non-volatile, non-drying and non-hardening binder. In practice the mica flakes are placed in over-lapping position as usual and built up in laminations, by the binder, to a sheet of the desired thickness which is one commercial product, other products of special forms, useful in the arts, being formed from the sheet as desired.

One object of my invention is to produce a substantially permanently flexible laminated mica product, and that is not resilient, by which I mean that the product does not spring back after bending, like a steel spring.

A further object is to provide a substantially permanently flexible laminated mica product that is non-resilient, and that has a high di-electric strength.

A further object is to provide a substantially permanently flexible laminated mica product of any desired thickness, that is non-resilient, that may be prepared in such desirable forms as plates, sheets, tubes, tapes and other products which may be deformed without destruction, and that will retain the desired characteristics of non-resilient flexibility and high di-electric strength over a long period of time.

A further object is to produce a flexible mica plate of superior quality at a comparatively low cost.

Other objects of my invention will be apparent to those skilled in the art upon reading the specification.

In the known processes of manufacture of flexible laminated mica plates, etc., of the type that is extensively used in the electrical industry, it is customary to cement the mica flakes with a solution of copal, shellac, or other gum, in alcohol or similar solvent, to which is generally added a proportion of non-drying vegetable oil, for example castor oil, to lengthen the duration of flexibility of the product. Such products while at first flexible to a greater or less degree, soon lose their flexibility and become stiff and rigid. The life of such a flexible product is generally a few months, frequently the products are quite stiff after about six months, and quite hard after a year, and accordingly, have a limited range of application in the arts.

Under the present invention, laminated flexible non-resilient mica products of a great variety of shapes and of many different thicknesses, including very thick plates and other shapes, have retained the characteristic properties described herein over a long period of time. For example, a substantially permanently flexible non-resilient laminated mica product made as hereinafter described, in the form of a sheet twelve-one-thousandths of an inch in thickness, after a period of about one year, could be rolled in a coil or roll, like a roll of paper, around a lead pencil, (approximately five-sixteenths inch diameter) without cracking or separation of the mica flakes, and could then be uncoiled and flattened out without mechanical injury or reduction of its di-electric strength.

The binder is made by incorporating a suitable resin-like body, for example natural resins such as rosin, various natural gums, synthetic resins such as the soluble varieties of bakelite, mowilith, etc., with an oil-like body which is essentially non-volatile, non-hardening, more-or-less viscous, and substantially inert to the resin-like product dissolved or incorporated therewith.

Suitable resin-like bodies which are operative for this purpose include the natural gums which melt without decomposition, for example, rosin, copal gum, and the like. Suitable synthetic resin-like bodies include the various types of fusible and soluble formaldehyde-phenol resins, vinyl resins, glycerol-phthalic anhydride resins, chlorinated di-phenyl resins, coumarone resins, etc. Well-known commercial synthetic resins of these types are "Bakelite," "Aroclor," "Cumar," "Mowilith," flexo-resin, etc. Among the various fluids which may be used, and which may be called solvents, are certain types of mineral oils, for example, a variety of mineral lubricating oil, such as that known in the trade as "Red Engine Oil", also cotton seed oil, and other oils which do not oxidize or harden after a considerable period of time; also such fluids as ethylene glycol, triethanolamine and propiophenone, or other high boiling ketone solvents of low volatility. Such solvents should have the property of not reacting chemically with the resin-like body used, and not undergoing change when exposed to contact with light or air, or when subjected to electrical stress. One type of mineral lubricating oil, or red engine oil of the kind above referred to is sold in the trade under the name of "Socony Junior Red Engine Oil", a paraffin base oil which has the following properties—

| | | | |
|---|---|---|---|
| Gravity | 24.6 | to | 26.1 |
| Flash point | 385° | to | 395° |
| Viscosity | 100° F. = | 223 | to 230 |

The binders may be made by first heating a quantity of resin until fluid, mixing a desired quantity of an oil-like fluid therewith, and then agitating until a uniform fluid mass is obtained; or, as an alternative method, the fluid oil may be heated and a quantity of pulverized resin melted therein and thoroughly incorporated with it; or the ingredients may be separately heated and then thoroughly mixed.

The proportions of the ingredients of the binder will naturally vary with the particular uses to which the resulting flexible mica products are to be applied; thus, for mica plates which are to be used at relatively elevated temperatures, as in certain types of transformers, a more viscous binder is used than when the flexible mica plate is used at lower temperatures. The proportions stated herein have been determined by experiment, but variations in the properties of the ingredients may necessitate a slight change in the quantities given. A practical test is one known as "slippage" which is applied to the completed flexible mica product, the mica pieces must not be displaced under differential pressure in the plane of the sheet, as by an applied pressure displacement between the fingers; this property is due to some extent to the viscosity of the solvent. Also, when desired, there may be added to the melted binder, or to the fluid before the resin is added, a suitable coloring material, an odorous material, a neutral substance whose chemical properties simulate those of the resin-like body employed, or other neutral or inert substances, the purpose of which will be that of imparting a distinct character to the ultimate product as for trade-marking, or otherwise disguising the exact nature of the binder used. Such added inert substances must not affect the mechanical or electrical properties of the resulting products.

In general, the proportions of resin-like substance and solvent are about as follows:—

| | Percent |
|---|---|
| Resin-like substance | 70 to 76 |
| Solvent | 30 to 24 |

Suitable proportions in percent by weight of the ingredients of different binders, which proportions may vary as much as about two percent, depending on several practical conditions such as variation in commercial products, atmospheric temperature, (summer or winter) temperature of use of final product, etc., are as follows—

| | Percent |
|---|---|
| Rosin (a light-colored commercial grade) | 73.6 |
| Red engine oil | 26.4 |
| Rosin | 74.6 |
| Cotton seed oil (commercial filtered) | 25.4 |
| Rosin | 74.6 |
| Ethylene glycol | 25.4 |
| Copal gum | 70 |
| Triethanolamine | 30 |
| Mowilith (synthetic vinyl resin) | 75 |
| Propiophenone | 25 |

The above formulas are substantially correct for summer-heat manufacture; for winter manufacturing the binder would be less viscous, for example a suitable rosin and oil binder for winter manufacture would contain—

| | Percent |
|---|---|
| Rosin | 72.5 |
| Red engine oil | 27.5 |

Corresponding variations would be made in other formulas.

For special applications, mixtures of selected resin-like bodies of the type herein indicated and which are miscible when molten may be incorporated with mixtures of miscible, essentially non-volatile, non-drying, moderately viscous, and non-hardening fluids of the type herein indicated, and the resulting binder used as described herein for the manufacture of the flexible mica products.

The several types of natural and synthetic resins cited above are hard at ordinary temperatures, and the quantities of solvent given have been found to give satisfactory results under the conditions stated. In addition to the above hard resins, certain classes of other resins which are softer than those above mentioned may be used with correspondingly reduced quantities of solvent so long as a desired degree of viscosity at operating temperatures of finished product, and also a desired degree of self-support of finished flexible product is obtained. For example, such relatively soft resins as soft gum elemi, and certain grades of the synthetic resins generally called Aroclors, Cumars, etc. may be used with reduced quantities of selected solvents, the quantities of solvents to be determined by experiment with the particular combination of resin and solvent, or combination of mixed resins, such as mixed hard and soft resins, either natural or synthetic, with simple or mixed solvents; the quantities of solvents required would be less than required for the hard resins, the correct proportions of resin and solvent combination would be entirely obvious to those skilled in the art in view of the detailed proportions given herein for the hard resins.

In one manufacture of flexible mica plates in accordance with this invention, the prepared binder mixture is warmed to a temperature at which it is suitably fluid and of low viscosity, and the hot mass preferably agitated frequently during the building of the plate. A suitable supporting frame is placed on a steam heated plate maintained at a temperature sufficient to keep the binder fluid, and a layer of comparatively large "paper mica" films (that is, mica films larger than the average size of mica flakes used in the plate) or heavy layers, if desired double layers, is laid upon the frame, and the fluid binder at a temperature well above the boiling point of water applied thereto as spaced drops or splashes, from about one-half inch to about one inch between centers, for example, by shaking a clean long free-bristled brush which had been dipped in the binder, or by brushing or spraying, for example by mechanical devices; more mica flakes are then super-imposed on the first coated layer, binder again applied and the process repeated until the desired thickness of sheet is obtained. A layer of the large size mica films, or a double layer if desired, is finally placed on the top as an upper layer for the completed mica sheet. The mica and binder mass is then allowed to remain on the steam plate, or heated for a short time in a steam heated oven, to permit the binder to flow uniformly over and between the mica flakes, which facilitates the removal of entrapped air bubbles, and also any low-boiling fractions of the oil, or other volatile ingredients present.

The mica sheet is now transferred from the frame, and at this stage may be surfaced on both sides with a layer of canvas, muslin, or paper, to provide outside layers and to permit the more convenient manipulation and safer storage when finished. The sheet, either surfaced or unsurfaced, is then placed on a hot plate to again render the binder somewhat fluid, and then rolled to secure thorough contact between the mica and the binder, and to distribute the same evenly and eliminate any unnecessary excess. If surfaced, the mica sheet is then finally rolled to the desired thickness on a cooling table;

if unsurfaced, an additional layer of clean mica flakes may be applied to each side to afford non-sticking faces. These sheets may be placed in storage until sold or transformed into other flexible mica products. The completed mica sheet is strong, tough, substantially permanently flexible, non-resilient, self-supporting, and has a high di-electric strength, and except for the higher temperatures is not affected by changes in atmospheric conditions.

As an alternative method of applying the binder, the hot mixture of resin and oil is treated with sufficient volatile solvent, such as denatured alcohol, acetone, etc. to dissolve it and yield a solution that at ordinary temperatures has about the same viscosity as the standard shellac solutions used in making a stiff non-flexible mica plate; or the volatile solvent may be added to the oil before the rosin is dissolved therein. This binder solution is then applied to the mica flakes, and the plate or sheet, etc. built up in entirely the customary manner. After the desired number of thicknesses of mica flakes have thus been cemented together, the plate or sheet, etc. is transferred to a steam table and rolled or pressed to secure through adhesion and integration, and then heated to remove the volatile solvent, either in the open on a steam plate or in a ventilated or solvent recovering oven, for example under reduced atmospheric pressure, leaving as binder the non-resiliently-flexible mixture of oil and resin. The plate is then reduced to the desired thickness by heating and rolling on a steam table and then cooled as described above.

While I have described the usual hand method of manufacture, it will be apparent to those skilled in the art that the manufacture of my novel flexible mica products is not limited to a practice of this method. Mechanical plate laying may be adapted to flexible mica and variations or improvements in the present accepted method of finishing the laminated sheets may be devised without departing from the scope of my invention. I believe myself to be the first to have discovered a binder for mica flakes that permits the manufacture of flexible mica products having the valuable and desirable characteristics and qualities herein described, and I have, therefore, claimed the essentials of my invention broadly without the recitation of details of the method which may vary in practice.

Having thus described my invention, what I claim as new, is:—

1. The method of making flexible non-resilient mica products, which comprises dissolving from about 70 percent to about 76 percent of rosin in from about 30 percent to about 24 percent of "Red Engine Oil" thereby forming an adhesive binder, and cementing mica flakes with said binder.

2. The method of making flexible non-resilient mica products which comprises making a binder of from about 72 percent to about 74 percent of rosin and from about 28 percent to about 26 percent of "Red Engine Oil", and cementing mica flakes with said binder.

3. A flexible mica product consisting of mica flakes cemented together with an adhesive containing from about 70 percent to about 76 percent of a resin-like material dissolved in from about 30 percent to about 24 percent of "Red Engine Oil", said mica product having the properties of substantially permanent non-resilient flexibility, mechanical strength, toughness, and high di-electric strength.

4. A flexible mica product consisting of mica flakes cemented together with an adhesive containing from about 70 percent to about 76 percent of a synthetic resin dissolved in from about 30 percent to about 24 percent of "Red Engine Oil", said mica product having the properties of substantially permanent non-resilient flexibility, mechanical strength, toughness, and high di-electric strength.

5. A flexible mica product consisting of mica flakes cemented together with an adhesive containing from about 70 percent to about 76 percent of rosin dissolved in from about 30 percent to about 24 percent of "Red Engine Oil", said mica product having the properties of substantially permanent non-resilient flexibility, mechanical strength, toughness, and high di-electric strength.

WILLIS A. BOUGHTON.